(12) United States Patent
Machuca et al.

(10) Patent No.: US 11,085,803 B2
(45) Date of Patent: Aug. 10, 2021

(54) ENTRAINED FLUID DETECTION DIAGNOSTIC

(71) Applicant: Micro Motion, Inc., Boulder, CO (US)

(72) Inventors: Michael P. Machuca, Austin, TX (US); Joseph A. Smith, Minneapolis, MN (US); Trever J. Ball, Coon Rapids, MN (US); Scot R. Foss, Eden Prairie, MN (US)

(73) Assignee: Micro Motion, Inc., Boulder, CO (US)

( * ) Notice: Subject to any disclaimer, the term of this patent is extended or adjusted under 35 U.S.C. 154(b) by 330 days.

(21) Appl. No.: 14/863,734

(22) Filed: Sep. 24, 2015

(65) Prior Publication Data
US 2017/0089743 A1 Mar. 30, 2017

(51) Int. Cl.
| | |
|---|---|
| *G01F 1/58* | (2006.01) |
| *G01F 1/74* | (2006.01) |
| *G01F 1/60* | (2006.01) |
| *G01F 15/08* | (2006.01) |

(52) U.S. Cl.
CPC .......... *G01F 1/588* (2013.01); *G01F 1/60* (2013.01); *G01F 1/74* (2013.01); *G01F 15/08* (2013.01)

(58) Field of Classification Search
CPC ... G01F 1/588; G01F 1/60; G01F 1/74; G01F 15/08
See application file for complete search history.

(56) References Cited

U.S. PATENT DOCUMENTS

| | | | |
|---|---|---|---|
| 5,328,601 A | * | 7/1994 | Schmidt ................ B01F 3/0412 134/170 |
| 6,017,143 A | | 1/2000 | Eryerek et al. |
| 6,654,697 B1 | | 11/2003 | Eryurek et al. |

(Continued)

FOREIGN PATENT DOCUMENTS

| | | |
|---|---|---|
| CN | 101506629 A | 8/2009 |
| CN | 102378901 A | 3/2012 |

(Continued)

OTHER PUBLICATIONS

Skartlien et al., "Simultaneous entrainment of oil and water droplets in high Reynolds number gas turbulence in horizontal pipe flow", Jul. 2011, ScienceDirect, pp. 1282-1293.*

(Continued)

*Primary Examiner* — John E Breene
*Assistant Examiner* — Eyob Hagos
(74) *Attorney, Agent, or Firm* — Christopher R. Christenson; Kelly, Holt & Christenson PLLC

(57) ABSTRACT

A magnetic flowmeter includes at least one coil configured to generate a magnetic field within a process fluid flow. A pair of electrodes is configured to detect an electromotive force within the flowing process fluid in response to the magnetic field. Measurement circuitry is coupled to the pair of electrodes and is configured to provide an indication of the detected electromotive force. A processor is coupled to the measurement circuitry and configured to receive the indication of the detected electromotive force and determine a flow-related output based on the detected electromotive force. A diagnostics component is configured to analyze a number of successive parameters of the magnetic flowmeter in order to provide an indication of a detected entrained fluid.

12 Claims, 12 Drawing Sheets

(56) References Cited

U.S. PATENT DOCUMENTS

| | | | |
|---|---|---|---|
| 7,659,828 B2 | 2/2010 | Wehrs et al. | |
| 9,027,418 B2 | 5/2015 | Smith et al. | |
| 2002/0144536 A1* | 10/2002 | Sullivan | G01N 33/34 73/19.05 |
| 2003/0005777 A1* | 1/2003 | Budmiger | G01F 1/588 73/861.12 |
| 2003/0051557 A1* | 3/2003 | Ishikawa | G01F 1/588 73/861.12 |
| 2005/0126305 A1* | 6/2005 | Schulz | G01F 1/58 73/861.12 |
| 2007/0044572 A1 | 3/2007 | Davis et al. | |
| 2007/0225922 A1* | 9/2007 | Foss | G01F 1/60 702/45 |
| 2008/0229846 A1* | 9/2008 | Grotzer | G01F 15/00 73/861.18 |
| 2009/0120203 A1* | 5/2009 | Schrag | G01F 1/58 73/861.12 |
| 2010/0288054 A1 | 11/2010 | Foss et al. | |
| 2011/0137584 A1* | 6/2011 | Needham | G01F 1/26 702/47 |

FOREIGN PATENT DOCUMENTS

| | | |
|---|---|---|
| JP | 2010271042 A | 12/2010 |
| JP | 2011526366 A | 10/2011 |

OTHER PUBLICATIONS

International Search Report and Written Opinion for PCT/US2016/053691, dated Feb. 24, 2017, 11 pages.

Gas Blowby, Process Particle Sizing—Real time particle analyzer powder and liquid processes. Article obtained at <http://www.enggcyclopedia.com> 4 pages.

First Office Action dated Mar. 19, 2019 for Japanese Patent Application No. 2018-515631, pp. 16 including English translation.

Chinese Office Action, dated Sep. 21, 2018, for Chinese Patent Application No. 201610044648.8, 22 Pages including English translation.

Extended European Search Report dated Apr. 5, 2019 for European Patent Application No. 16849841.8, 7 pages.

Second Chinese Office Action dated Aug. 7, 2019, for Chinese Patent Application No. 201810044648.8, 22 pages including English translation.

European Communication pursuant to Article 34(3) EPC dated Apr. 15, 2020, for European Application No. 1684984.8, 9 pages.

Rejection Decision dated Mar. 2, 2020 for Chinese Patent Application No. 201610044648.8, 19 pages including English transiation.

Third Chinese Office Action dated Nov. 25, 2020 for Chinese Patent Application No. 201610044048.8, 23 pages including Eriglish transiafion.

Rejection Decision dated Jun. 7, 2021, for Chinese Patent Application No. 201610044648,8, 22 pages including English translation.

\* cited by examiner

ENTRAINED FLUID DETECTION DIAGNOSTIC

BACKGROUND

Separators are known process units that are used for a variety of industrial processes. Separators operate by receiving a process stream and separating materials of the process stream, often into waste products and material for further processing. Separators can be used for a variety of process mixtures including liquids, gasses, solids or combinations thereof, in a variety of industrial processes. Particularly, they can be useful in the oil and natural gas extraction processes.

One problem facing separators handling multi-phase flows is that of entrained fluids in downstream processing, particularly gas blow-by. In a separator receiving gas and liquid flows, if liquid is completely drained from a vessel, gas can freely flow to downstream equipment designed to handle only liquid flows. This can result in damage, and potential hazards for the system, often requiring activation of relief devices to remove the entrained gas from the system.

SUMMARY

A magnetic flowmeter includes at least one coil configured to generate a magnetic field within a process fluid flow. A pair of electrodes is configured to detect an electromotive force within the flowing process fluid in response to the magnetic field. Measurement circuitry is coupled to the pair of electrodes and is configured to provide an indication of the detected electromotive force. A processor is coupled to the measurement circuitry and configured to receive the indication of the detected electromotive force and determine a flow-related output based on the detected electromotive force. A diagnostics component is configured to analyze a number of successive parameters of the magnetic flowmeter in order to provide an indication of a detected entrained fluid.

These and various other features and advantages that characterize the claimed embodiments will become apparent upon reading the following detailed description and upon reviewing the associated drawings.

DETAILED DESCRIPTION OF ILLUSTRATIVE EMBODIMENTS

Figure 1:
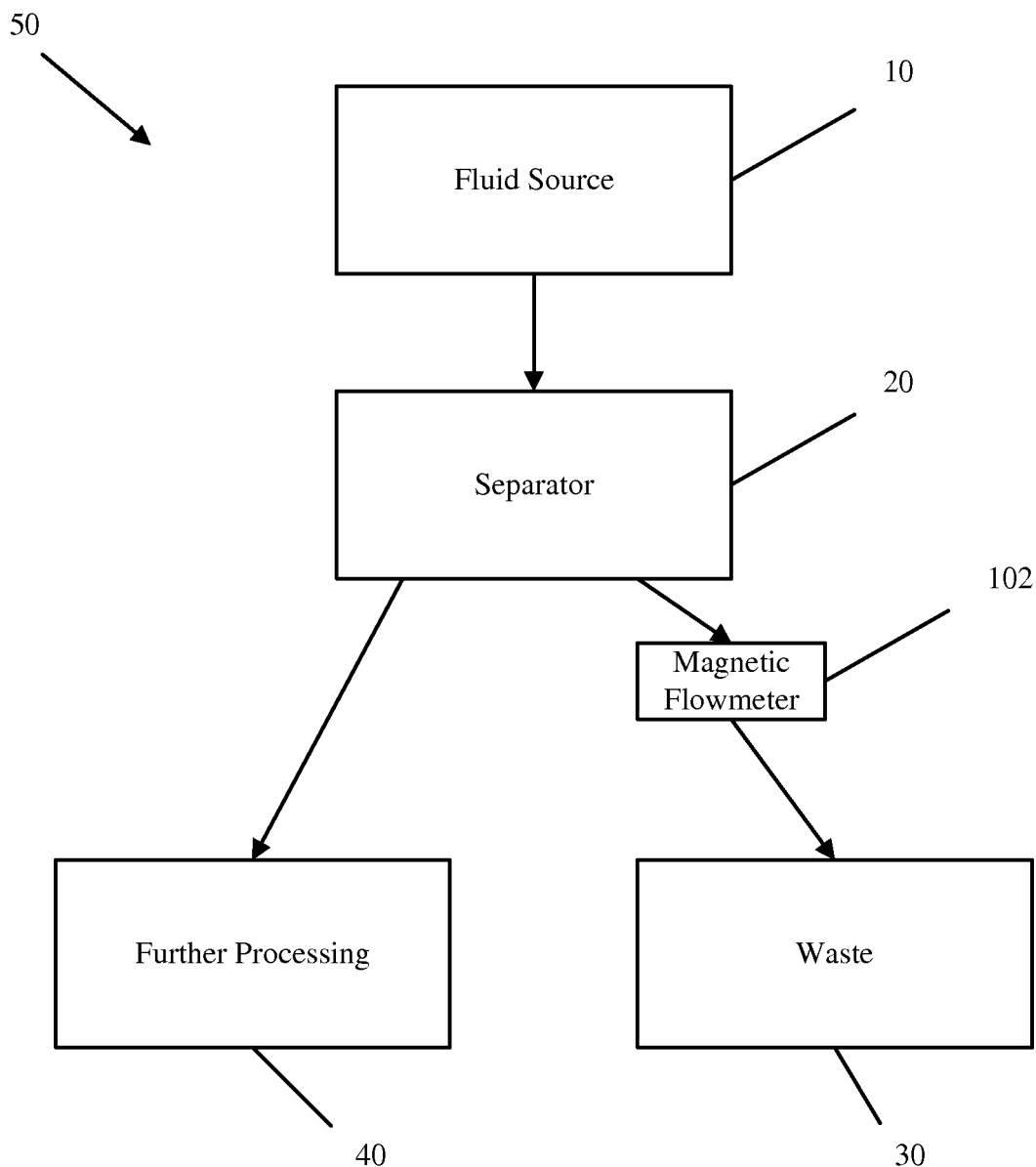
FIG. 1 is a diagrammatic view of an exemplary process environment in which embodiments of the present invention are particularly useful.

FIG. 1 illustrates a simplified exemplary process environment in which embodiments of the present invention are particularly useful. A process fluid may circulate within, or be generated by, an exemplary process environment 50. The process fluid may be natural gas, oil or another fluid. The fluid originates from an exemplary fluid source 10, such as a well head, and is provided to separator 20, which is configured to separate the fluid from non-productive material, for example separating natural gas from fracking fluid or processed water. In one embodiment, once the fluid has passed through the separator 20, the product moves on in a process stream 40 for further downstream processing. The non-product material may instead be directed to a waste stream 30. A flowmeter 102 is configured to measure one or more process variables or parameters relating to the waste stream 30 leaving the separator 20.

Early detection of entrained fluids in a process stream may minimize gas or oil entering a waste line or storage system. When gas is detected within a waste stream, it either must be recaptured or flared. Early detection of entrained gas may reduce flare. Minimizing flaring reduces environmental impacts as well as increasing overall gas production. In a typical installation, entrained gas is either vented through a pressure relief vent to the atmosphere, or if a flare system is installed within the process environment, the entrained gas is burned. If there is a vapor recovery unit installed, a process environment may be able to recapture that gas, however if this is not the case, the revenue from the gas may be lost. In addition to lost revenue, the released gas may also result in non-compliance with regulations concerning carbon emissions for a particular process environment.

Entrained gas within a process stream may cause an increase in costs. Entrained gas in a process stream will typically cause a volumetric flow meter to over-register the volume of the water produced. This could result in additional trips to the field by the pumper when the storage tank is not full. Therefore, detection and removal of entrained gas within a system is important to managing waste treatment costs and detecting other potential problems.

Therefore, it is desired for a magnetic flowmeter 102 to be able to detect entrained gas and/or oil within a process stream in order to take corrective action as soon as possible.

Figure 2A:
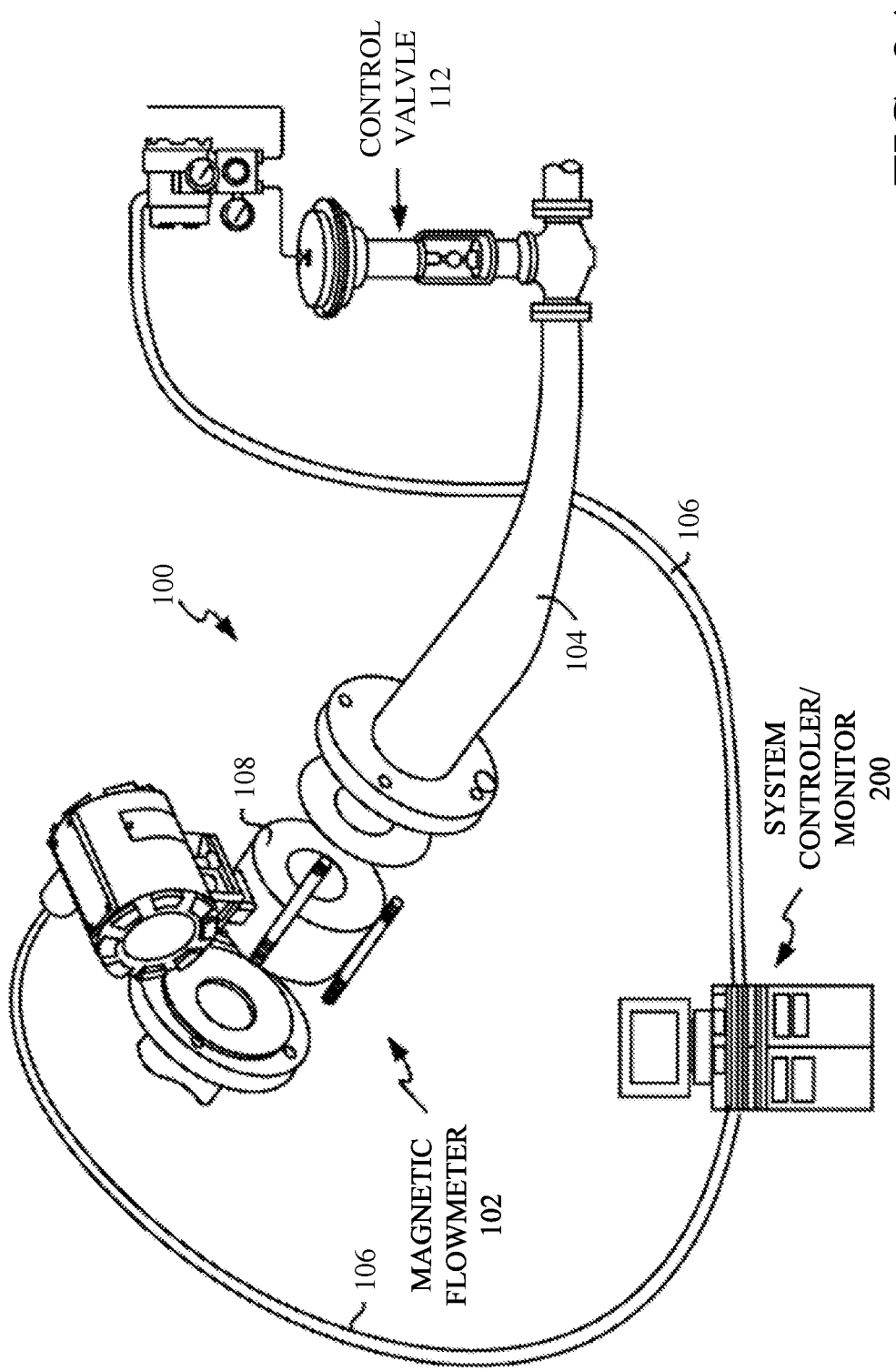
FIG. 2A illustrates a magnetic flowmeter within a process control system in accordance with one embodiment of the present invention.

FIG. 2A illustrates an exemplary magnetic flowmeter within a process control or monitoring system. Magnetic flowmeter 102 is configured to monitor flow related process variables associated with fluids within a process plant. Examples of such fluids include slurries and liquids in chemicals, pulp, petroleum, gas, pharmaceutical, food and other fluid processing plants. In environment 100, magnetic flowmeter 102 is coupled to process piping 104 that is also coupled to a control valve 112.

In a magnetic flowmeter, such as flowmeter 102, the monitored process variables relates to the velocity of the process fluid flowing through process piping and flow tube 108. The measurements taken by the flowmeter 102 may also be used to provide other information to an operator, for example an indication of entrained gas or oil in a waste stream, as described in greater detail below. Magnetic flowmeter 102 includes electronics housing 120 connected to flow tube 108. Magnetic flowmeter 102 outputs are configured for transmission over long distances to a controller, for example controller 200, or an indicator via communication bus 106. In a typical processing plant, communication bus 106 can be a 4-20 mA current loop, a FOUNDATION™ Fieldbus segment, a pulse output/frequency output, a Highway Addressable Remote Transducer (HART®) protocol communication, a wireless communication connection, such as that in accordance with IEC 62591, Ethernet, or a fiber optic connection to a controller such as system controller/monitor 200, or other suitable device. System controller 200 may be programmed as a process monitor, to display flow information and provide potential indications for a human operator of a problem in the system, or as a process controller to control the process using control valve 112 over communication bus 106.

Figure 2B:
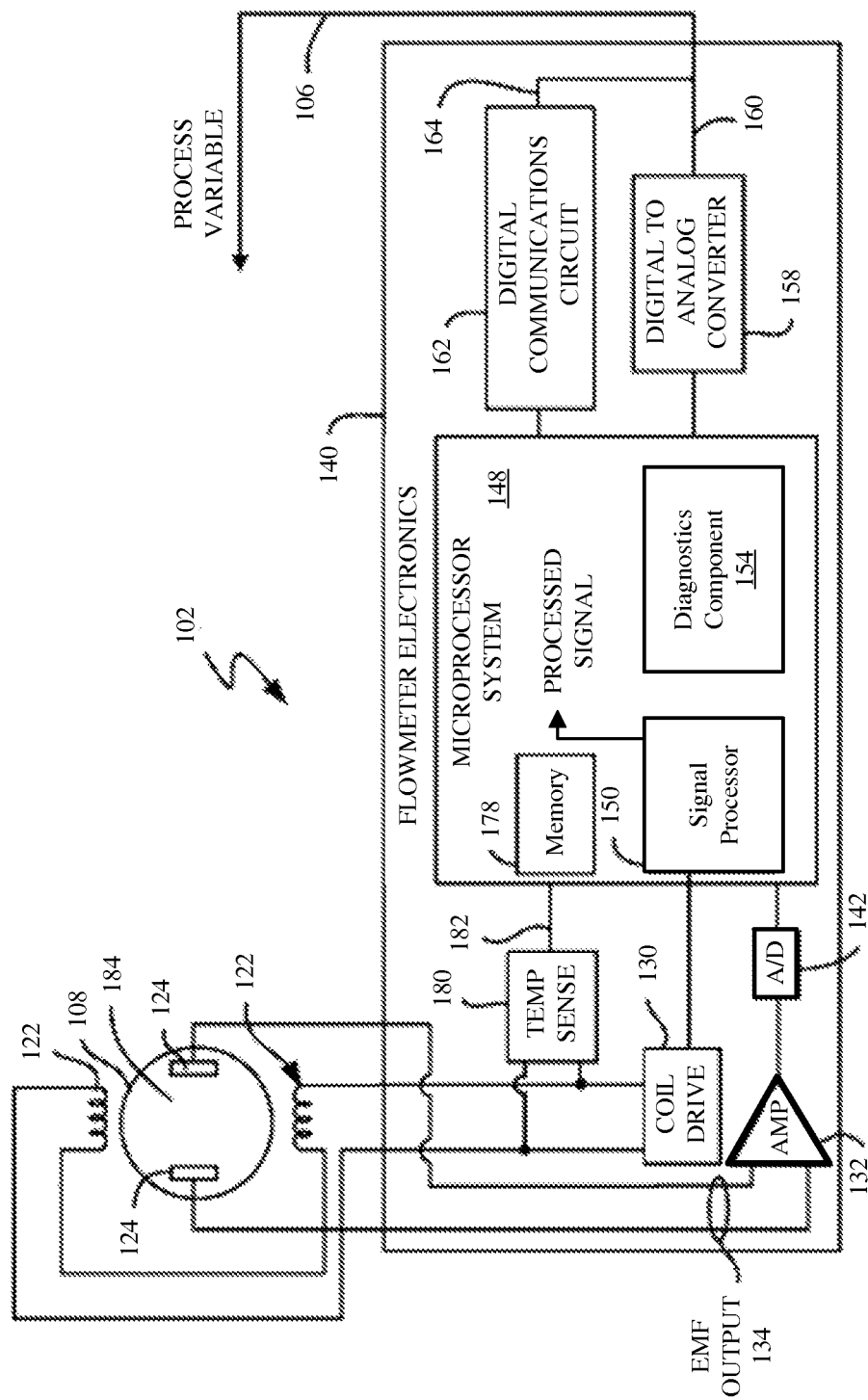
FIG. 2B is a simplified block diagram of a magnetic flowmeter in accordance with one embodiment of the present invention.

FIG. 2B is a simplified block diagram of a magnetic flowmeter in accordance with one embodiment of the present invention. Coils 122 are configured to apply an external magnetic field in the fluid flow in response to an applied drive current from coil drive circuitry 130. EMF sensors (electrodes) 124 electrically couple to the fluid flow and provide an EMF signal output 134 to measurement circuitry that includes amplifier 132 and analog to digital converter 142. The signal provided to amplifier 132 is related to an EMF generated in the fluid flow due to the applied magnetic field, and fluid velocity. Analog to digital converter 142 provides a digitized EMF signal to microprocessor system 148. A signal processor 150 is implemented in microprocessor system 148 of flowmeter electronics 140 which couples to the EMF output 134 to provide an output 152 related to fluid velocity. Memory 178 can be used to store program instructions or other information as discussed below. Flowmeter 102 also includes diagnostics component 154, configured to execute digital signal processing algorithms to detect entrained air or oil within the process fluid stream in accordance with embodiments described herein.

In one embodiment, flowmeter 102 may communicate with one or more remote devices using digital communications circuit 162, which, in one embodiment, can operate on a wireless process communication loop or segment. In which case, digital communication circuit includes a wireless transceiver, such that it is capable of interacting with external wireless devices, based upon commands and/or data from microprocessor system 148.

Entrained gas and/or oil may be detectable within a process stream, in one embodiment, by tracking and analyzing a variety of measurements or parameters of magnetic flowmeter 102. Some of the measurements or parameters include: a flow value, a differential electrode voltage value, an empty pipe value, and a signal to noise ratio. The flowmeter 102 may also calculate a statistic associated with the received value, for example standard deviation or a coefficient of variation. By monitoring these variables over time, flowmeter 102 can detect when the process stream contains entrained gas or oil. For example, as discussed in greater detail below, entrained gas can be detected, in one embodiment, by rapid increases and decreases in measured or calculated variable values related to flow value, differential electrode voltage, and empty pipe value. Entrained oil, on the other hand, may be detected, in one embodiment, by sustained increases in measurements related to empty pipe value, empty pipe phase angle and empty pipe magnitude. Having a diagnostic method that can alert an operator to the presence entrained gas or oil in a system may allow for more rapid corrective action.

Process Variables Indicating Entrained Fluids

FIGS. 3A-3D illustrate a number of process variables that may be useful for detecting entrained gas in a process stream in accordance with one embodiment of the present invention. When gas is entrained within a fluid stream, a signal to noise ratio will decrease due to the gas bubble coming in contact with the electrodes 124 as they flow through the stream. This rapid change in variable output may be visible in the signals reported from the flowmeter 102. The results shown in FIGS. 3A-3D illustrate different process variable measurements that may be obtained, in one embodiment, by the magnetic flowmeter 102, or calculated based on the received signals and provided for analysis to the controller 200. In one embodiment, the results presented in FIGS. 3A-3D are normalized results.

As shown in FIG. 3A-3D, at various points in time during the exemplary process, air was introduced to the fluid stream. The air injection points 306 correspond to entrained air introduced into a flow stream. The entrained air was introduced approximately at 19 seconds, 33 seconds, 46 seconds, and 63 seconds.

Figure 3A:
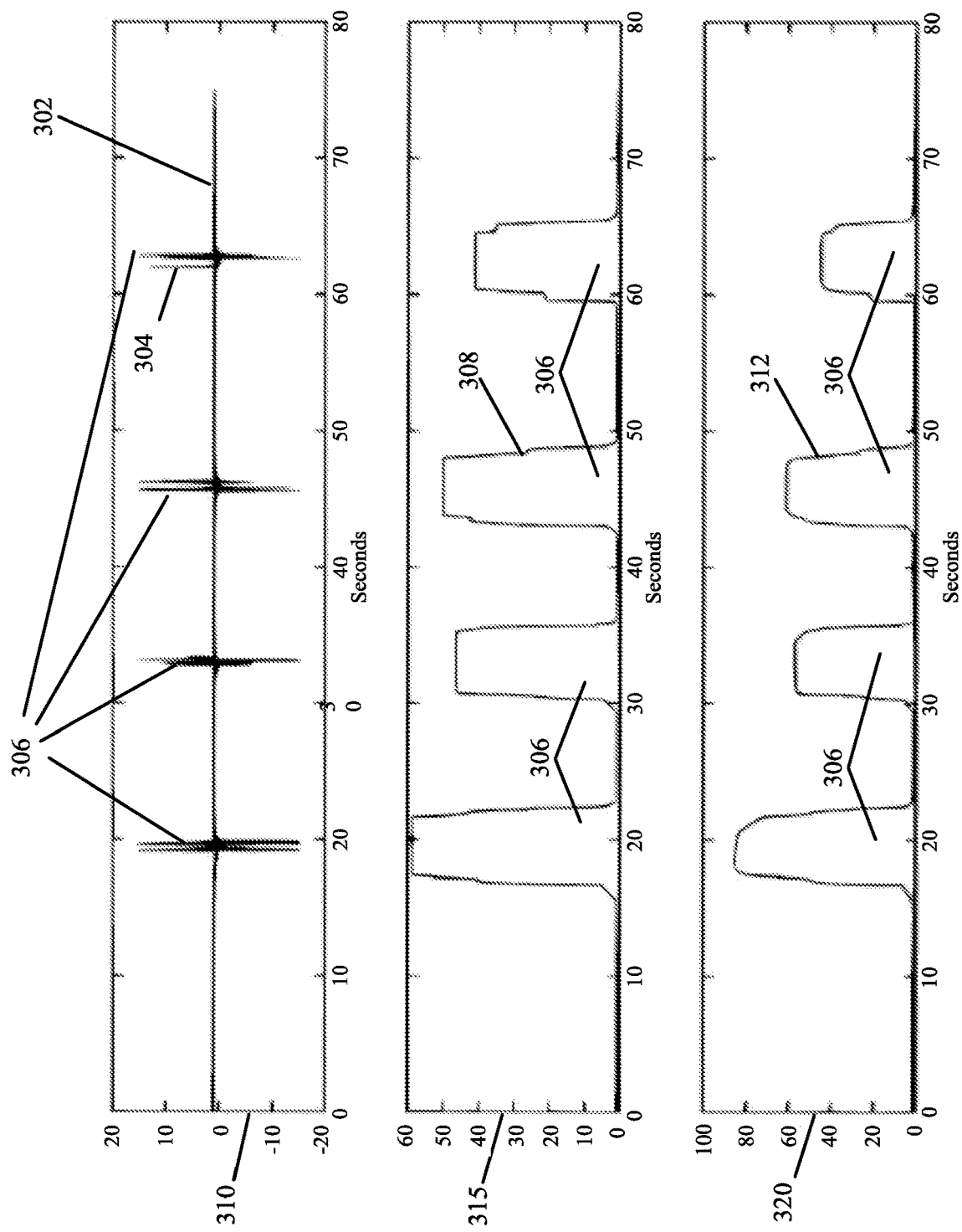
FIGS. 3A-3D illustrate results of measuring a plurality of process variables over time that may be useful for detecting entrained gas in a process stream in accordance with one embodiment of the present invention.

FIG. 3A illustrates graph 310, graph 315, and graph 320, which show raw signals, calculated standard deviation, and the calculated coefficient of variation, respectively, of flow measurements of magnetic flowmeter 102. Graph 310 shows exemplary raw flow value measurements 304 and average flow value measurements 302 of flowmeter 102, as air was injected into the process stream at air injection points 306. Graph 315 shows calculated standard deviation 308 of the raw flow value over time. Graph 320 shows the coefficient of variation 312 of the raw signal value over time. The coefficient of variation 312 is calculated from the standard deviation 308 divided by the average 302. One advantage of using a coefficient of variation 312 is that the produced detection is indifferent to changes in flow value. Therefore, entrained gas can be detected by the received flow value signal 304, the calculated standard deviation value 308 and/or the calculated coefficient of variation 312. As shown in graph 315, the standard deviation value 308 shows an increase of over 40 times the baseline value, where the baseline was taken when no entrained air was in the system. The coefficient of variation 312 also shows an increase of over 40 times that of the baseline value. The significant increase and decrease in calculated standard deviation 308 and coefficient of variation 312, as the entrained air contacts and passes by electrodes 124, provides a distinctive and recognizable diagnostic tool for detecting entrained gas in the process stream.

Figure 3B:
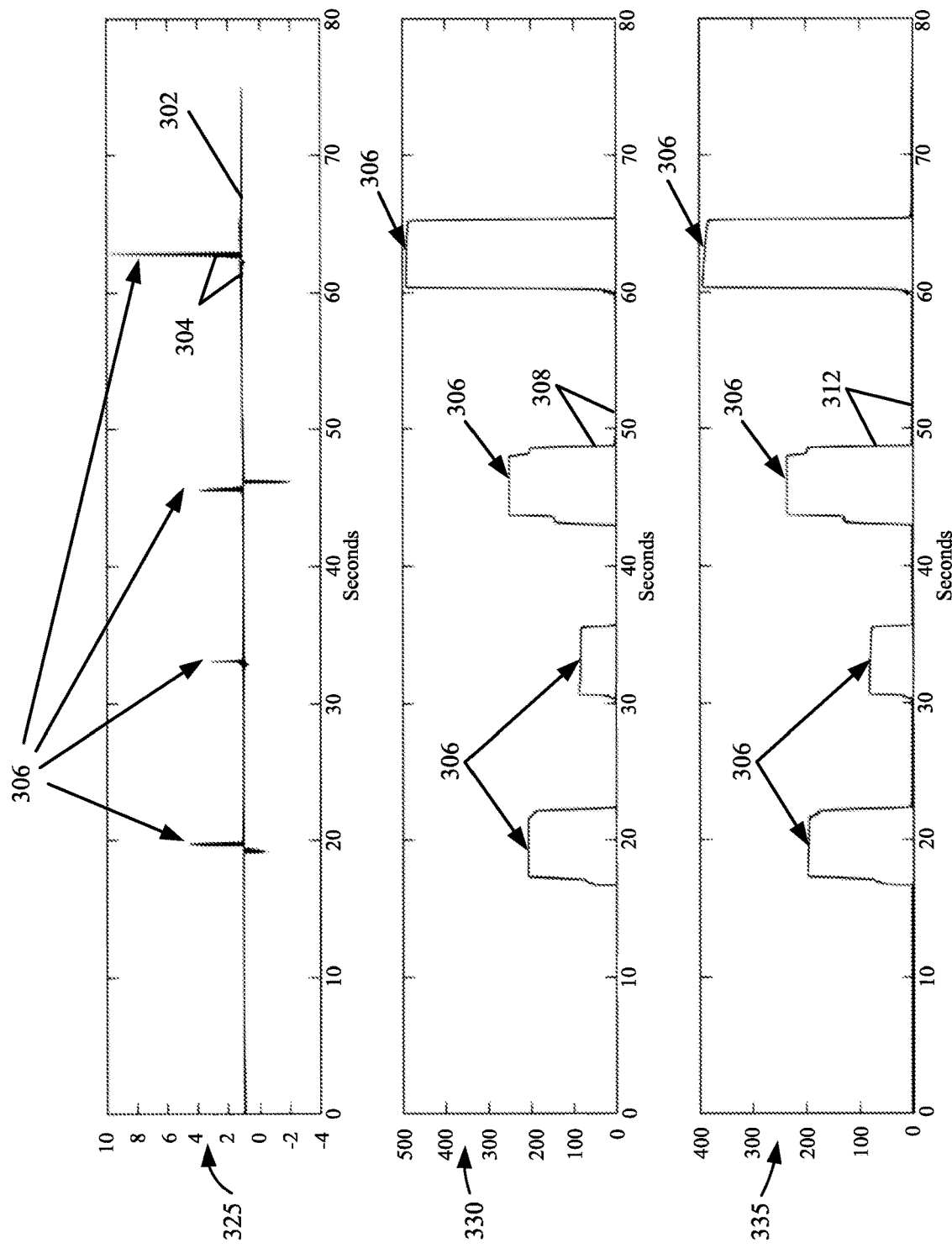

FIG. 3B illustrates graph 325, graph 330, and graph 335, which show raw signals, calculated standard deviation, and the calculated coefficient of variation, respectively, of differential electrode voltage measurements of magnetic flowmeter 102. Graph 325 shows exemplary raw differential electrode voltage measurements 304, and average differential electrode data 302 acquired by magnetic flowmeter 102, as air was injected into the system at various air injection points 306. Graph 330 provides a calculated standard deviation 308 of the received differential electrode voltage over time. Graph 335 shows the coefficient of variation 312 of the differential electrode voltage over time. As shown in graph 330, the standard of deviation 308, at a minimum, rapidly increased to over 100 times the baseline value, where the baseline taken when no entrained gas was present in the system, and then rapid returned to the baseline value. Similarly, the coefficient of variation 312 also showed very large increase over the baseline, and rapid decrease back to the baseline. The rapid increase and decrease of the standard deviation 308 and coefficient of variation 312 provides a detectable indication that entrained gas may be present in the process stream.

Figure 3C:
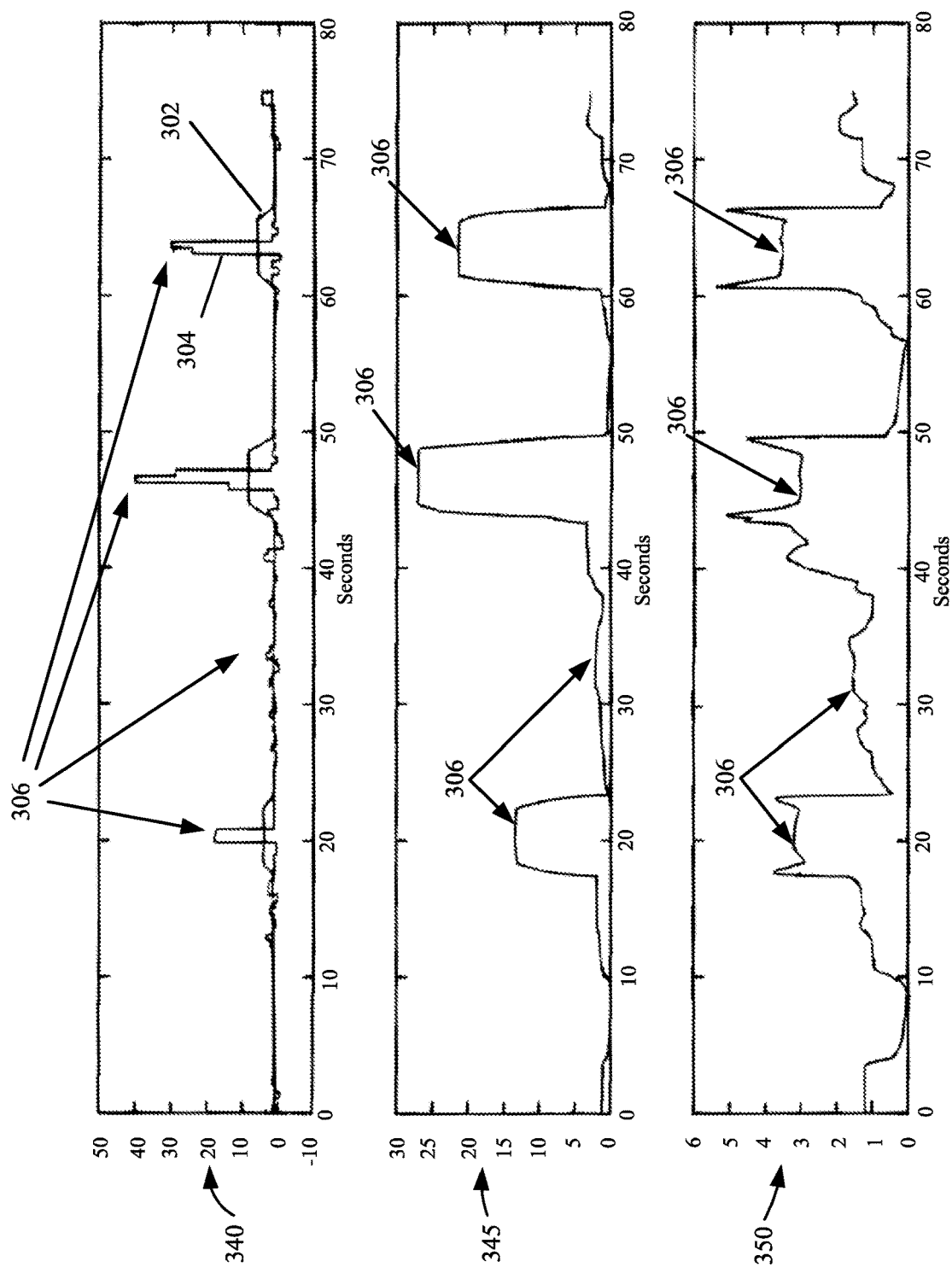

FIG. 3C illustrates graph 340, graph 345, and graph 350, which correspond to the raw signals, calculated standard deviation, and the calculated coefficient of variation, respectively, of empty pipe value measurements of magnetic flowmeter 102. Graph 340 provides exemplary raw empty pipe value measurements 304, and average empty pipe value measurements 302 of magnetic flowmeter 102, as air was injected into the system at various air injection points 306. Graph 345 shows a calculated standard deviation 308 of the received empty pipe value measurements over time. Graph 350 provides the coefficient of variation 312 of the empty pipe value measurements over time. The empty pipe value, as shown in graphs 340, 345 and 350, successfully detected three out the four occurrences of air injected into the system. In the example illustrated by FIG. 3C, the empty pipe value was only measured once per second. Taking the empty pipe value measurement more frequently, for example twice per second or four times per second, may result in an empty pipe value-based diagnostic successfully detecting all occurrences of air entrained in the process stream. In one embodiment, using a common mode electrode voltage-based diagnostic instead of an empty pipe value-based diagnostic may also provide a tool capable of detecting all of the entrained air occurrences. As shown in FIG. 3C, measuring the empty pipe value over time may be able to detect a significant number of occurrences of gas entrained in the system.

Figure 3D:
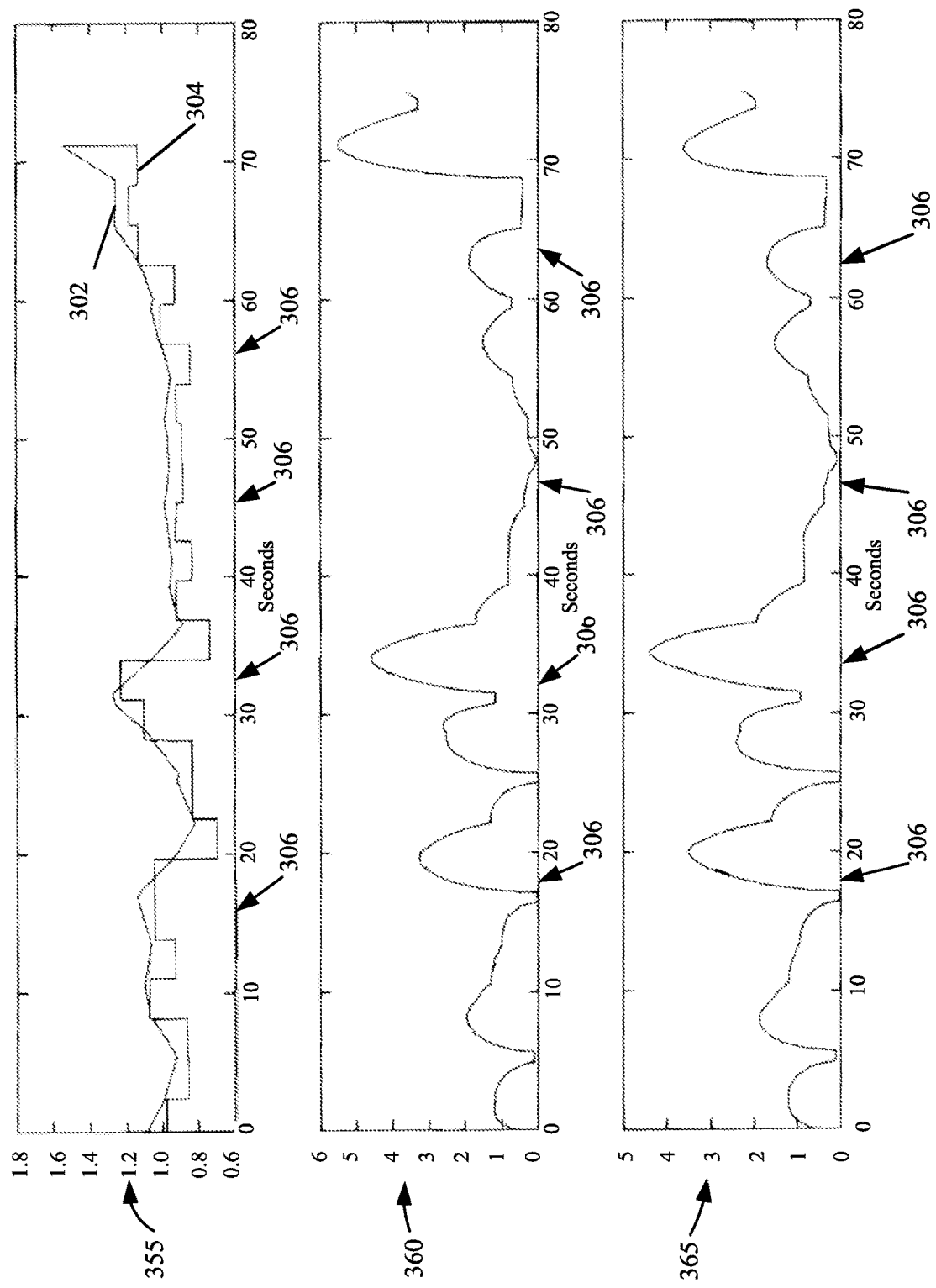

FIG. 3D illustrates graph 355, graph 360, and graph 365, which correspond to the raw signals, calculated standard deviation, and the calculated coefficient of variation, respectively, of signal-to-noise ratio measurements of magnetic flowmeter 102 taken at 5 Hz. Graph 355 provides exemplary raw signal-to-noise ratio measurements 304, and average raw signal-to-noise ratio measurements 302 of magnetic flowmeter 102, as air was injected into the system at various air injection points 306. Graph 330 provides a calculated standard deviation 308 of the signal-to-noise ratio measurements over time. Graph 335 provide the coefficient of variation 312 of the signal-to-noise ratio measurements over time. When gas becomes entrained in a fluid, the signal to noise ratio should decrease over time, due to gas bubbles coming into contact with electrodes. This may be seen, over a long period of time, in a system with or without cavitation. However, as shown in FIG. 3D over a short period of time, use of the signal to noise ratio does not show a significant change when entrained gas is present in the system.

FIGS. 4A-4D illustrate results of measuring a number of parameters over time that may be useful for detecting entrained oil in a process stream in accordance with one embodiment of the present invention. Entrained oil may be detected, in one embodiment, as the conductivity of the fluid in the process fluid stream changes due to the introduction of oil. Detection of entrained oil is important as it may be indicative of a leak and thus be useful in identifying the source of the leak. In obtaining the results shown in FIGS. 4A-4D, an oil, canola oil, was injected into a stream of water. The oil was slowly injected into the stream over time, starting at injection point 406, corresponding to roughly 60 seconds. In one example, the results presented in FIGS. 4A-4D are normalized.

Figure 4A:
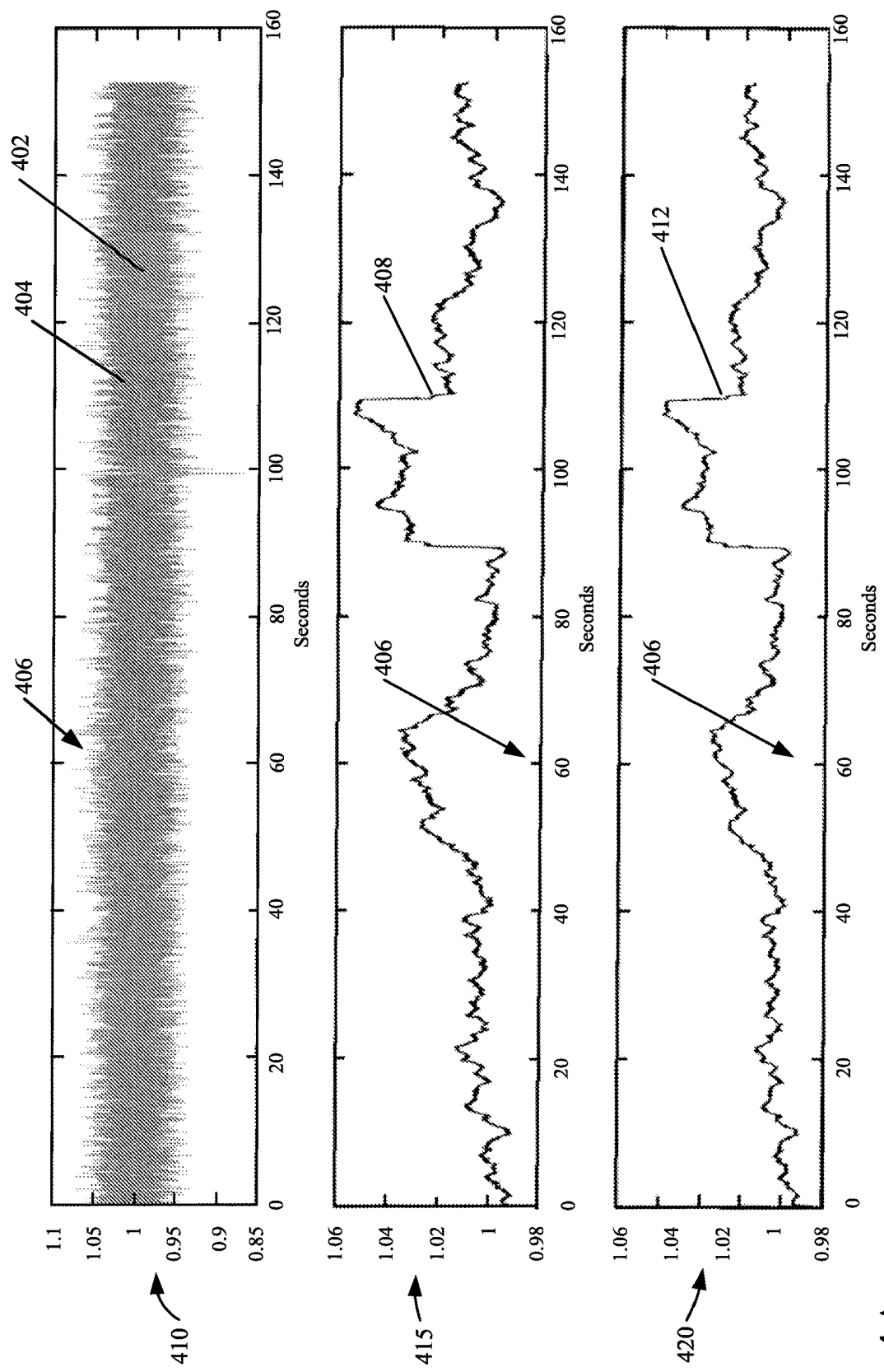
FIGS. 4A-4D illustrate results of measuring a plurality of process variables over time that may be useful for detecting entrained oil in a process stream in accordance with one embodiment of the present invention.

FIG. 4A illustrates graph 410, graph 415 and graph 420, which correspond to the raw signals, calculated standard deviation, and the calculated coefficient of variation, respectively, of flow value measurements of magnetic flowmeter 102. Graph 410 shows exemplary raw flow value measurements 404, and average flow value measurements 402 of magnetic flowmeter 102, as the oil was introduced to the system, starting at oil introduction point 406. Graph 415 provides a calculated standard deviation 408 of the flow value measurement over time. Graph 420 provides a coefficient of variation 412 of the flow value measurement over time. As shown in FIG. 4A, the flow measurement value and the calculated standard deviation did not vary significantly as oil was introduced into the system. This contrasts to the significant and rapid spike in flow value measurements seen in FIG. 3A when entrained air was introduced to the system. A diagnostic system in accordance with embodiment described herein may, therefore, be able to detect and identify entrained gas in a process stream.

Figure 4B:
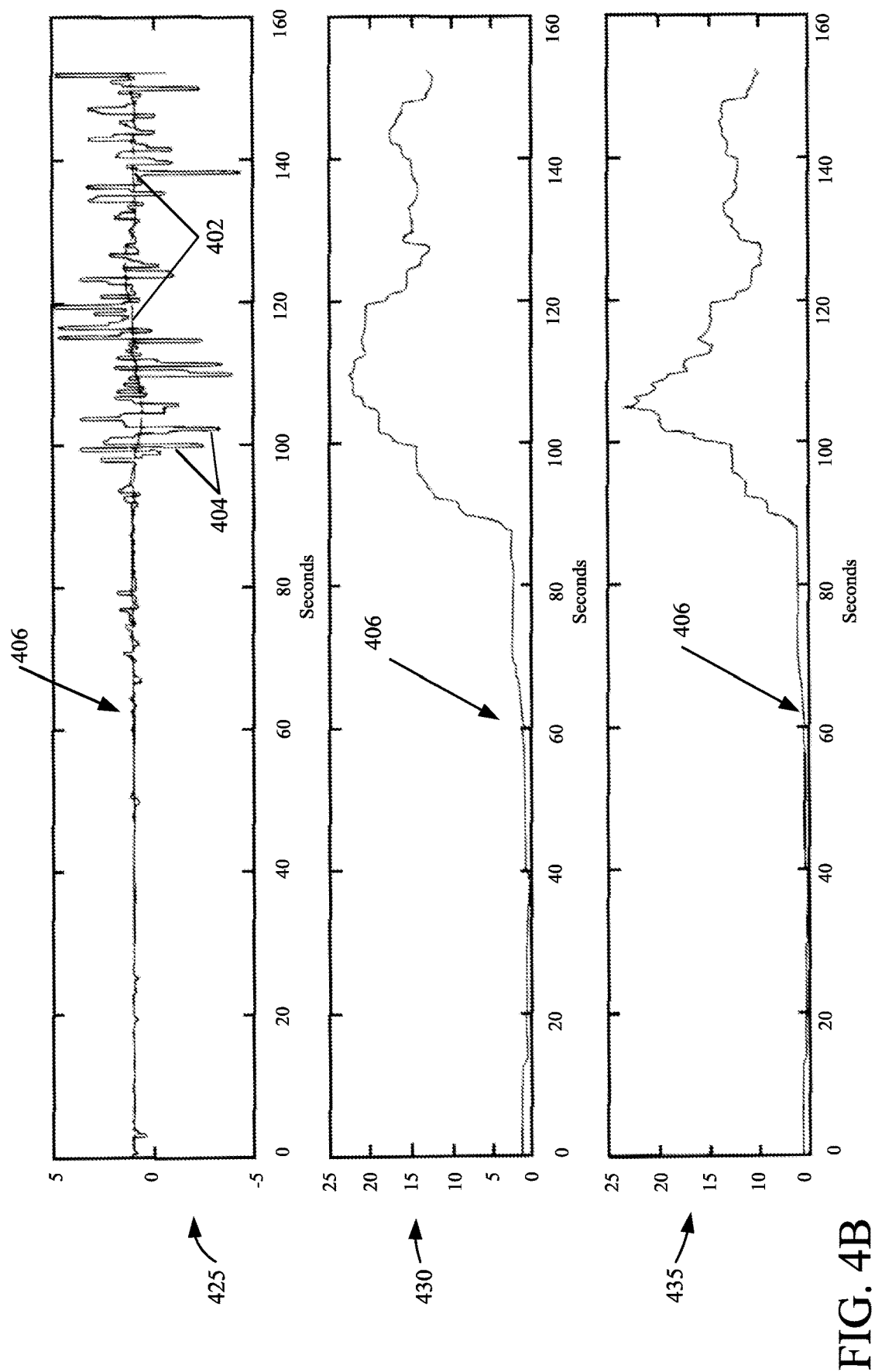

FIG. 4B illustrates graph 425, graph 430 and graph 435, which correspond to the raw signals, calculated standard deviation, and the calculated coefficient of variation, respectively, of empty pipe value measurements of magnetic flowmeter 102. Graph 425 provides exemplary raw empty pipe value measurements 404, and average empty pipe value measurements 402 of magnetic flowmeter 102, as oil was introduced to the system over time, starting at oil introduction point 406. Graph 430 shows a calculated standard deviation 408 of the empty pipe value measurement over time. Graph 435 provides a coefficient of variation 412 of the received empty pipe value measurement over time. As shown in FIG. 4B, the empty pipe value measurements show a rapid and sustained increase over time after the oil is introduced into the system. As shown in graph 425, the raw signal of the empty pipe value measurements starts to fluctuate significantly around 100 seconds. The standard deviation of the empty pipe value also shows a significant and sustained increase starting at around 90 seconds, which corresponds to 30 seconds after the oil has entered the fluid stream. Additionally, the coefficient of variation 412 shows a significant increase, as compared to a previously-measured baseline, around 90 seconds. Also, as shown in graph 430, the standard deviation 408 does not just increase but it increases to over 20 times that of the pre-entrained oil condition. The standard deviation also remains at least 10 times greater than the baseline over time. The coefficient of variation 412 also shows significant and detectable increases rising to over 30 times that of the baseline and consistently staying at over 10 times the baseline.

The results shown in FIG. 4B indicate that empty pipe value measurements can reliably provide an indication as to when entrained oil enters a system. Additionally, when compared to the empty pipe value measurements seen in FIG. 3C, corresponding to entrained air in the system, the empty pipe value measurements of FIG. 4B show a sustained increase when entrained oil is present. Thus, the empty pipe value measurement provides a reliable indication of an entrained foreign fluid in the process stream, and can reliably identify the foreign fluid as entrained air or entrained oil based on the received or calculated variable measurements.

Figure 4C:
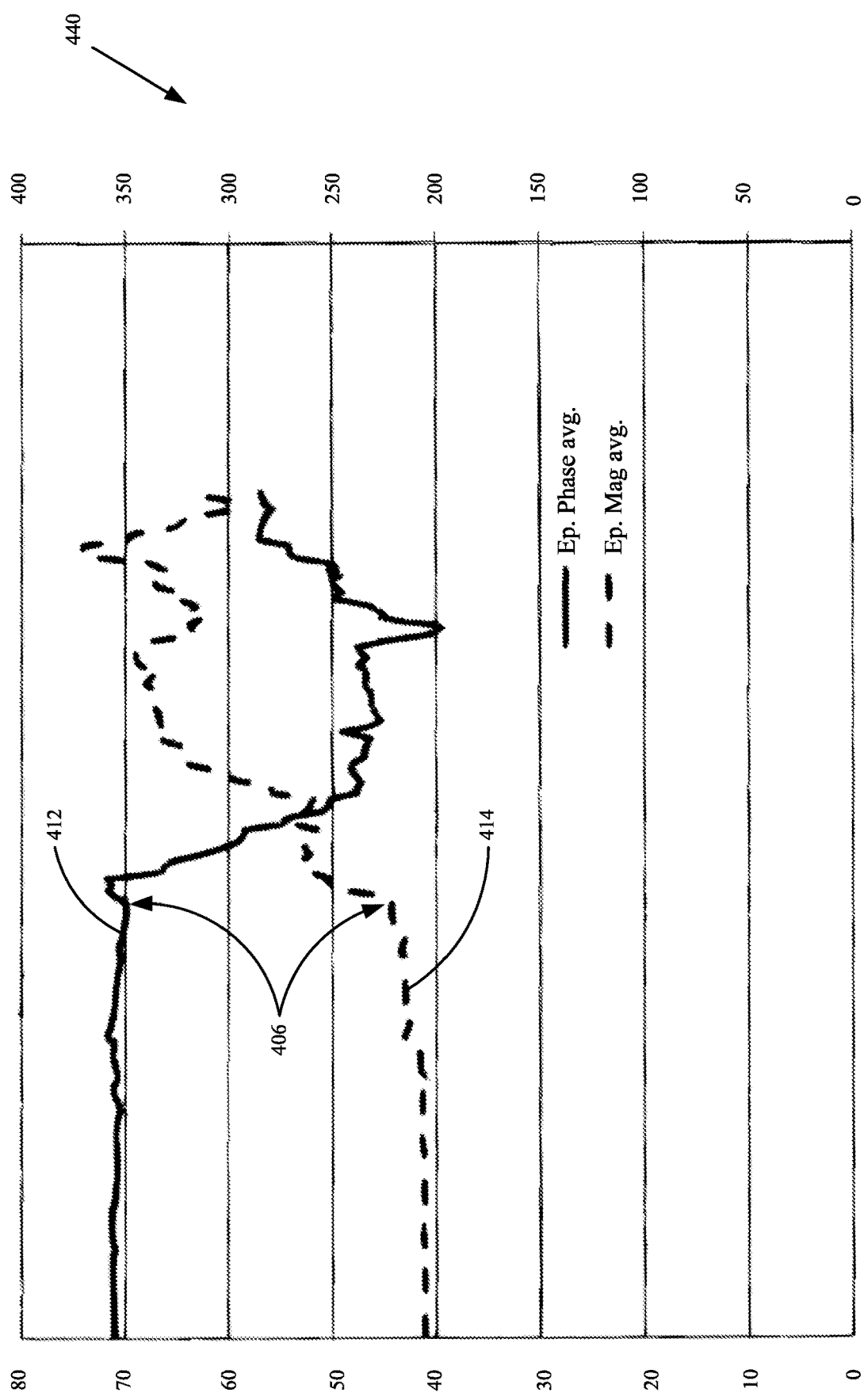

FIG. 4C illustrates graph 440, which corresponds to the standard deviation of the empty pipe phase angle 412, and empty pipe value magnitude 414 measurements calculated from the empty pipe values of magnetic flowmeter 102, as oil was introduced to the system over time, starting at oil introduction point 406. The left-hand side axis shows the phase angle 412, measured in degrees, and the right-hand side axis shows the magnitude 414 in kOhms. As shown, the phase angle 412 shows a rapid and significant decrease just after the entrained oil has been introduced into the process fluid stream. Additionally, the phase angle magnitude 414 shows a significant increase just after the entrained oil has entered the system. The phase angle 412 and the magnitude 414 see a significant change due to the conductivity and dielectric constant changing as the oil enters the process fluid stream.

Figure 4D:
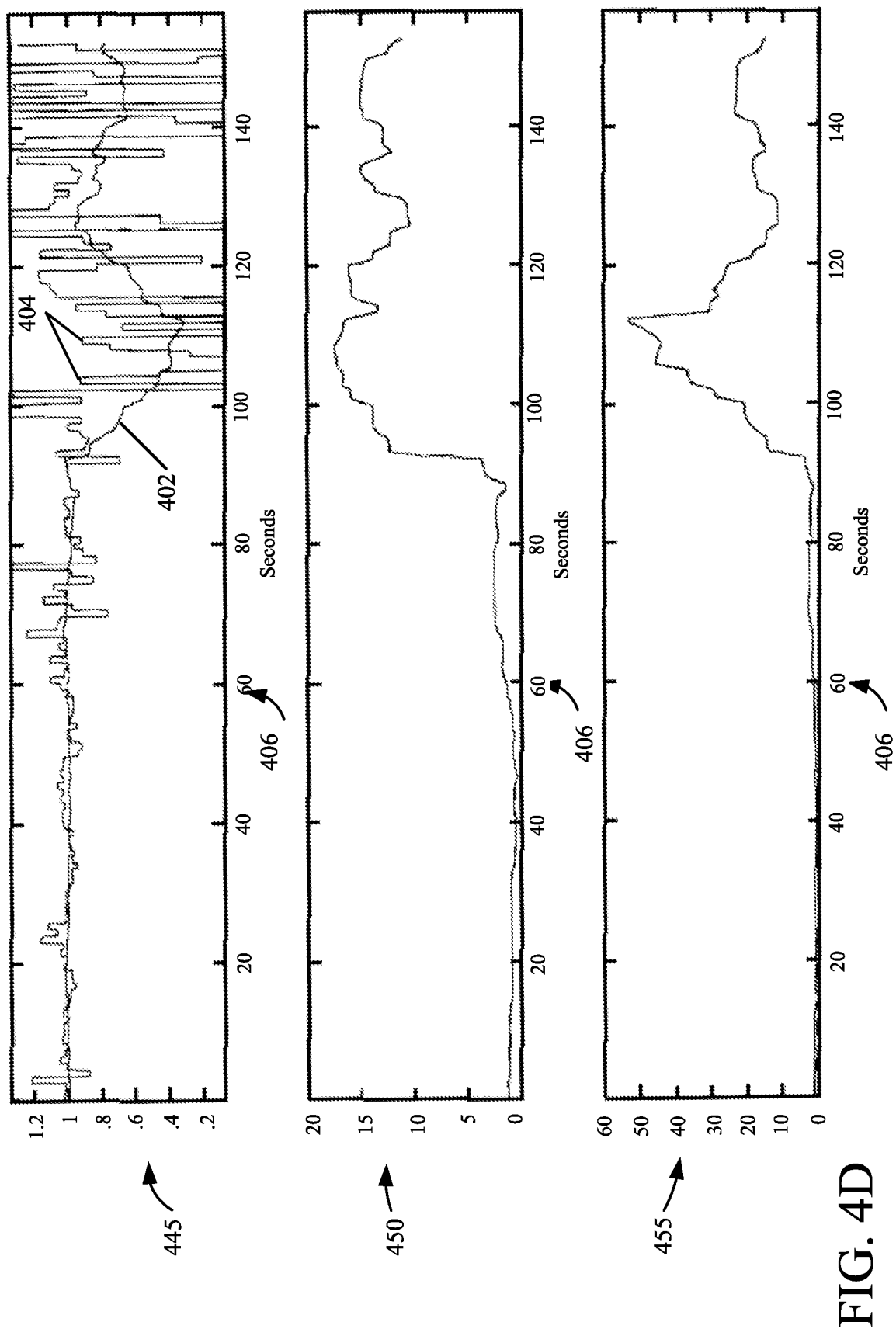

FIG. 4D illustrates graph 445, graph 450 and graph 455, which correspond to the raw signals, calculated standard deviation, and the calculated coefficient of variation, respectively, of empty pipe value phase angle measurements of magnetic flowmeter 102. Graph 445 shows exemplary raw empty pipe value phase angle measurements 404, and average empty pipe value phase angle measurements 402 of magnetic flowmeter 102, as oil was introduced to the system over time, starting at oil introduction point 406. Graph 450 provides a calculated standard deviation 408 of the received empty pipe value phase angle measurement over time. Graph 455 provides a coefficient of variation 412 of the received empty pipe phase angle value measurement over time. In each of graphs 445, 450 and 455 the point at which oil enters the system is shown by entrained oil injection point 406. As clearly shown at about 90 seconds, the average empty pipe phase angle signal shows a dramatic decrease and then the beginning of an increase again at 110 seconds. The raw empty pipe phase angle signal also starts to show dramatically larger variations in values over time. The standard deviation 408 of the empty pipe phase angle also shows a significant increase starting around 90 seconds, increasing to over 10 times of that of the baseline. Additionally, the coefficient of variation 412 of the empty pipe phase angle also shows a significant increase around 90 seconds as shown by graph 455. The graphs 445, 450 and 455 provide evidence that an empty pipe phase angle measurement-based diagnostic tool can provide an indication of entrained oil in a process stream.

The different variable measurements and calculations shown in FIGS. 3 and 4 illustrate a variety of reliable indicators of entrained foreign fluids within a process fluid stream. Additionally, several of these indicators provide identifiable trends to identify an entrained fluid as either entrained gas or entrained oil. In one embodiment, flowmeter 102 may process all or a subset of the process variable measurements: flow value, empty pipe measurement, empty pipe phase angle, empty pipe value magnitude, differential electrode voltage, common mode voltage, and/or signal-to-noise ratio to provide a useful diagnostic output. However, it is also contemplated that at least some of the parameters/data could be transmitted to a process controller or other suitable device, and that such diagnostics could be performed by that device. The flowmeter, or other process device, may then calculate either, or both of, a standard deviation or a coefficient of variation for each of process variable measurements. The flowmeter may also be programmed with a threshold value for each of the variables or parameters, their standard deviation, and/or their coefficient of variation. When the flowmeter detects that a received signal is above the set threshold, it may be programmed to deliver an alert. The threshold value may be selectable by an operator, pre-set by a manufacturer, or based on historical data indicating a baseline value for a process fluid stream without any entrained fluid In one embodiment, a graphical representation of the raw variable measurements and/or the calculated statistics may be presented to an operator on an external display. In another embodiment, the standard deviation and/or the coefficient of variation is provided to the operator with or without the raw signals on an external display. In another embodiment, none of the signals are provided on a display, but the flowmeter, or other process device, is configured to analyze the received signals and provide an alert of entrained oil or air within the process stream, e.g. an audible alarm or a flashing light. In one embodiment, the signals are provided on an external display along with an alerting mechanism when entrained oil and/or gas is detected. In one embodiment, the alert may be an audible alert. In another embodiment, the alert may be a visual alert, for example an indication on a display or a flashing light located within the process environment. Alternatively, the alert could be displayed at a remote location to an operator.

Methods of Identifying Entrained Fluids

Figure 5:
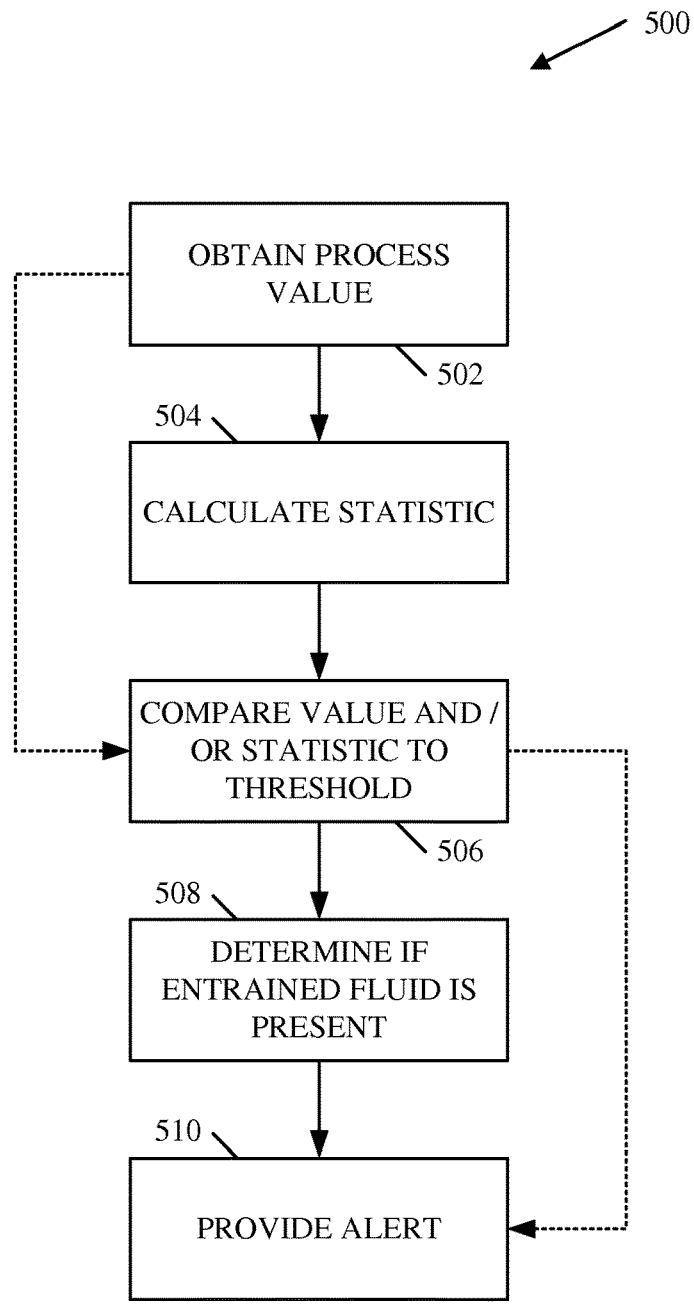
FIG. 5 illustrates an exemplary method of providing an indication of an entrained fluid in a process environment in accordance with one embodiment of the present invention.

FIG. 5 illustrates an exemplary method of providing an indication of an entrained fluid in a process environment in accordance with one embodiment of the present invention. In block 502, method 500 obtains process variable measurements using a magnetic flowmeter. The process variable measurements may include any of a flow value, empty pipe value, differential electrode voltage value, empty pipe phase angle or magnitude value, a common mode value, or any combination thereof. Additionally, any one or more of these values may be obtained over time and stored. In one embodiment, a controller, such as microprocessor system 148 (shown in FIG. 2B), compares the obtained signals to a threshold value. The controller may also store the obtained process values in memory in order to perform statistical analyses on such data.

In block 504, the controller calculates one or more statistics from the process variable measurement(s) obtained at block 502. The calculated statistic may be, for example, a standard deviation, and/or a coefficient of variation. In one embodiment, the controller stores the calculated statistic in conjunction with the raw process variable in a memory component, such as memory 178.

At block 506, the controller compares the obtained process variable and/or the calculated statistics against a preset threshold. In one embodiment, the threshold is preset by a manufacturer and may be selectable by a user, for example depending on the anticipated components of the fluid in the process stream. In one embodiment, the process variable and the calculated statistic may be normalized and the threshold may correspond to an increase as compared to a known baseline. For example, the threshold could be, in one embodiment, a detection of a standard deviation value more than 5 times. However, other multiples, such as more than 10 times or more than 20 times a known baseline can also be used. As seen in FIGS. 3 and 4, entrained gas provides a detectable change from a baseline when plotted over time. In another embodiment, the threshold value may correspond not to a prescribed value, but a prescribed change, for example, a detected increase in the standard deviation and/or coefficient of variation of more than 5 times from a value detected in the previous 60 second. However, other multiples, such as more than 10 times, or more than 20 times a value detected in the previous 60 seconds can be used. Additionally, other time windows, such as the last 90 seconds, or in the last few minutes can also be used.

At block 508, the controller determines that entrained gas or oil is present in the process stream, for example based on a detected change in received process variable information or calculated statistic(s) over time. For example, if a change is detected in the standard deviation of the flow value, this indicates that entrained gas and not entrained oil is present. Additionally, for example, a sudden increase and decrease in differential electrode voltage or empty pipe value may indicate that entrained gas is present, while a sustained increase in empty pipe value may indicate that entrained oil, and not entrained gas, is present in the process fluid stream. However, in another embodiment, the controller does not detect whether the foreign fluid is entrained oil or gas, but only determines that a foreign fluid is present.

As shown in FIGS. 3 and 4, tracking and analyzing different diagnostic measurements over time may allow an operator to detect and identify an entrained foreign fluid within the process stream. Entrained oil may be detectable by a change in the standard deviation of an empty pipe value and a common mode voltage. The common mode voltage standard deviation may also indicate entrained air over a period of time. Additionally, if the concentration of entrained oil is high enough, using a measurement of a differential electrical voltage, may detect the entrained oil.

In block 510, the method provides an alert to the operator. In one embodiment, the alert may comprise an indication that something is wrong with the process environment based on the obtained process variables and/or the calculated statistic, suggesting that an operator of the flowmeter check the process and determine what is causing the error. However, in another embodiment, based on the detected change in process variables and calculated statistics the controller may determine that entrained gas or oil is present within the system and provide a more detailed alert in block 510 for example providing an alert to an operator of the system that entrained oil is present in the system. Additionally, based on the location of the specific flowmeter 102, the method 500 may also indicate a potential location of the entrained fluid within the system. For example, entrained oil may indicate a leaky valve. Based on the location of the flowmeter 102 within the environment 100, the controller may be able to indicate that a leak is most likely upstream. In an exemplary environment with multiple flowmeters 102, an alert from a second flowmeter 102 downstream from a non-alerting first flowmeter 102 may indicate that the leak is from a valve located in between the two flowmeters 102.

In one embodiment, in block 516, after the controller determines an alert is needed, the context of the alert may be displayed on a suitable display. This may comprise, in one embodiment, a visual alert indicating that an entrained fluid is present. In another embodiment, the alert may comprise an identification of the entrained fluid as either entrained air or entrained oil. In another embodiment, the alert may indicate a potential location for the source of the entrained fluid.

Although the present invention has been described with reference to preferred embodiments, workers skilled in the art will recognize that changes may be made in form and detail without departing from the spirit and scope of the invention.

What is claimed is:

1. A magnetic flowmeter for detecting entrained fluid in a process stream from a separator, the magnetic flowmeter comprising:
   at least one coil configured to generate a magnetic field within a process fluid flow;
   a pair of electrodes configured to detect an electromotive force within the flowing process fluid in response to the magnetic field;
   measurement circuitry coupled to the pair of electrodes and configured to provide an indication of the detected electromotive force;
   a processor coupled to the measurement circuitry and configured to receive the indication of the detected electromotive force and, based on the indication of the detected electromotive force, calculate a process fluid flow measurement;
   a diagnostics component coupled to the measurement circuitry and configured to detect entrained fluid based on analysis of at least one empty pipe value; and
   wherein the processor is configured to communicate the process fluid flow measurement over a communication bus, the processor being configured to automatically provide an alert when entrained fluid is detected by the diagnostics component to be above a set threshold, wherein the alert includes an identification of a type of entrained fluid.

2. The magnetic flowmeter of claim 1, further comprising a communications module configured to couple to a wireless process communication loop.

3. The magnetic flowmeter of claim 1, wherein the diagnostic component is configured to calculate a standard deviation of the process fluid flow measurement.

4. The magnetic flowmeter of claim 1, wherein the diagnostic component is configured to calculate a coefficient of variation of the process fluid flow measurement.

5. The magnetic flowmeter of claim 1, wherein the set threshold is preset by a manufacturer.

6. The magnetic flowmeter of claim 1, wherein the set threshold is selectable by a user.

7. The magnetic flowmeter of claim 1, wherein the set threshold is based on historical data indicating a baseline value for a process fluid stream without any entrained fluid.

8. The magnetic flowmeter of claim 1, wherein the type of entrained fluid identified is a gas.

9. The magnetic flowmeter of claim 1, wherein the type of entrained fluid identified is an oil.

10. A magnetic flowmeter for detecting entrained fluid in a process stream from a separator, the magnetic flowmeter comprising:
    at least one coil configured to generate a magnetic field within a process fluid flow;
    a pair of electrodes configured to detect an electromotive force within the flowing process fluid in response to the magnetic field;
    measurement circuitry coupled to the pair of electrodes and configured to provide an indication of the detected electromotive force;
    a processor coupled to the measurement circuitry and configured to receive the indication of the detected electromotive force and, based on the indication of the detected electromotive force, calculate a process fluid flow measurement;
    a diagnostics component configured to detect entrained fluid based on analysis of an empty pipe phase angle; and
    wherein the processor is configured to communicate the process fluid flow measurement over a communication bus, the processor being configured to automatically provide an alert when entrained fluid is detected by the diagnostics component to be above a historical data threshold, wherein the alert includes an identification of a type of entrained fluid.

11. The magnetic flowmeter of claim 10, wherein the historical data threshold is indicative of a baseline value for a process fluid stream without any entrained fluid.

12. A magnetic flowmeter for detecting entrained oil in a process stream from a separator, the magnetic flowmeter comprising:
    at least one coil configured to generate a magnetic field within a process fluid flow;
    a pair of electrodes configured to detect an electromotive force within the flowing process fluid in response to the magnetic field;
    measurement circuitry coupled to the pair of electrodes and configured to provide an indication of the detected electromotive force;

a processor coupled to the measurement circuitry and configured to receive the indication of the detected electromotive force and, based on the indication of the detected electromotive force, calculate an empty pipe value measurement;
a diagnostics component coupled to the measurement circuitry and configured to detect entrained oil based on analysis of the empty pipe value measurement; and
wherein the processor is configured to communicate the empty pipe value measurement over a communication bus, the processor being configured to automatically provide an alert when entrained oil is detected by the diagnostics component to be above a set threshold.

* * * * *